US012706477B2

(12) United States Patent
Huntsman et al.

(10) Patent No.: US 12,706,477 B2
(45) Date of Patent: Aug. 11, 2026

(54) VEHICLE BATTERY WITH A SELF-CONTAINED BACKUP CAPABILITY

(71) Applicant: Southeast Toyota Distributors, LLC, Deerfield Beach, FL (US)

(72) Inventors: Kevin Huntsman, Deerfield Beach, FL (US); Cody Weber, Deerfield Beach, FL (US); David Schulte, Deerfield Beach, FL (US); Idoko Abuh, Deerfield Beach, FL (US)

(73) Assignee: Southeast Toyota Distributors, LLC, Deerfield Beach, FL (US)

( * ) Notice: Subject to any disclaimer, the term of this patent is extended or adjusted under 35 U.S.C. 154(b) by 108 days.

(21) Appl. No.: 17/860,903

(22) Filed: Jul. 8, 2022

(65) Prior Publication Data

US 2023/0026299 A1 Jan. 26, 2023

Related U.S. Application Data

(60) Provisional application No. 63/221,293, filed on Jul. 13, 2021.

(51) Int. Cl.
*H02J 7/10* (2006.01)
*G06F 1/30* (2006.01)
(Continued)

(52) U.S. Cl.
CPC .................. *H02J 9/08* (2013.01); *G06F 1/30* (2013.01); *H01M 10/4257* (2013.01);
(Continued)

(58) Field of Classification Search
CPC .......... H02J 9/08; H02J 7/0025; H02J 7/0048; H02J 7/005; H02J 7/342; H02J 9/066; H02J 7/0042; H02J 7/1423; H02J 9/061; H02J 2310/46; H02J 1/122; G06F 1/30; G06F 1/28; G06F 1/305; G06F 1/263; H01M 10/4257; H01M 10/441; H01M 50/204;
(Continued)

(56) References Cited

U.S. PATENT DOCUMENTS

| | | | | |
|---|---|---|---|---|
| 2006/0125443 A1* | 6/2006 | Bolduc | ................. | H02J 7/1423 320/104 |
| 2015/0188207 A1* | 7/2015 | Son | ..................... | H01M 50/271 429/224 |

(Continued)

*Primary Examiner* — Rexford N Barnie
*Assistant Examiner* — Swarna N Chowdhuri
(74) *Attorney, Agent, or Firm* — ArentFox Schiff LLP

(57) ABSTRACT

Disclosed herein are a vehicle or other system battery with a self-contained backup capability and a method for providing power to a vehicle using the vehicle or other system battery with a self-contained backup capability. In one aspect, the vehicle battery comprises, a main battery portion, a backup battery portion, and a control device for selectively communicating a transfer of energy from the backup battery portion to the main battery portion when a voltage level or other health indicator of the main battery portion is determined to be below a reference voltage threshold, wherein the main battery portion and backup battery portion are each re-chargeable via an alternator of the vehicle when the control device communicates the transfer of energy between the main battery portion and the backup battery portion.

19 Claims, 6 Drawing Sheets

(51) Int. Cl.
*H01M 10/42* (2006.01)
*H01M 10/44* (2006.01)
*H01M 10/46* (2006.01)
*H01M 10/48* (2006.01)
*H01M 50/204* (2021.01)
*H02J 7/34* (2006.01)
*H02J 7/50* (2026.01)
*H02J 7/82* (2026.01)
*H02J 7/84* (2026.01)
*H02J 9/06* (2006.01)
*H02J 9/08* (2006.01)
*H02J 105/33* (2026.01)

(52) U.S. Cl.
CPC ....... *H01M 10/441* (2013.01); *H01M 50/204* (2021.01); *H02J 7/342* (2020.01); *H02J 7/585* (2026.01); *H02J 7/82* (2026.01); *H02J 7/84* (2026.01); *H02J 9/066* (2013.01)

(58) Field of Classification Search
CPC .. H01M 2220/20; H01M 10/46; H01M 10/48; H01M 2010/4271; H01M 10/425; H01M 50/249; Y02T 10/70
USPC ........................................................... 307/64
See application file for complete search history.

(56) References Cited

U.S. PATENT DOCUMENTS

| | | | | |
|---|---|---|---|---|
| 2018/0252774 | A1* | 9/2018 | Ciaccio ............... | F02N 11/0866 |
| 2018/0301919 | A1* | 10/2018 | Rumbaugh ......... | H01M 10/425 |
| 2022/0072975 | A1* | 3/2022 | O'Gorman .............. | B60L 53/00 |

* cited by examiner

VEHICLE BATTERY WITH A SELF-CONTAINED BACKUP CAPABILITY

CROSS-REFERENCE TO RELATED APPLICATIONS

This application claims the benefit of U.S. Provisional Application No. 63/221,293, filed Jul. 13, 2021 and hereby incorporates by reference herein the contents of this application.

FIELD OF TECHNOLOGY

Aspects of the present disclosure relate to the field of providing a backup and/or supplemental power source for a vehicle or other system. Specifically, aspects of the present disclosure are directed to a system and method for providing a self-contained backup or supplemental capability for a vehicle battery.

BACKGROUND

Usage of vehicle batteries as a source of power for electronic equipment and accessories is now standard and ubiquitously available. However, such usage means the demand on the vehicle battery continues to grow as more and more devices rely on vehicles to provide power to all types of equipment that might be used during the operation of the vehicle. In turn, a dead battery not only makes the vehicle inoperable but also creates an inconvenience for the owner who may be using the vehicle battery to provide power to a computer, cellular telephone, etc.

One approach to remedy a dead vehicle battery is to travel with a portable jump starter features, such as jumper cables, open the hood of the vehicle, connect the vehicle battery to a battery of another vehicle, and jump start the vehicle with the dead battery. However, this approach requires manual procedures and knowledge of how to avoid accidentally shocking a person, possibly causing battery explosion, etc., which may be an inconvenient process. Another approach is to carry a portable battery that may temporarily be connected in parallel with the vehicle battery. However, although some drivers may check the health of the vehicle battery, likely rarely would they check the health of a backup battery, which is often simply stored in the trunk of the vehicle.

Therefore, there remains an unmet need for a more efficient and convenient system of readily providing a backup power source for such applications as in vehicles.

SUMMARY

Aspects of the disclosure relate to a vehicle or other system battery with a self-contained backup capability, and more specifically, to systems and methods of providing a vehicle or other system battery with a self-contained backup capability to provide power to the vehicle or other system, as well as any accessories/electronics connected to the vehicle or system.

In one example aspect, a vehicle battery or other system battery with a self-contained backup capability is provided. The vehicle or other system battery comprises: a main battery portion, a backup battery portion, and a control device for selectively communicating a transfer of energy from the backup battery portion to the main battery portion when a voltage or other health indicator level of the main battery portion is determined to be below a reference threshold. The main battery portion and backup battery portion are each re-chargeable via an alternator of the vehicle when the control device communicates the transfer of energy between the main battery portion and the backup battery portion. In one example aspect, the control device is a microcontroller unit.

In one example aspect, the transferring of energy from the backup battery portion to the main battery portion includes: forming a first circuit path so as to place the main battery portion in parallel with the backup battery portion, such that the alternator of the vehicle is in enabled to charge both the main battery portion and the backup battery portion contemporaneously until at least the voltage or other health indicator level of the main battery portion is determined to be greater than or equal to the reference threshold. When the voltage or other health indicator level of the main battery portion is determined to be greater than or equal to the reference threshold, a second circuit path is formed such that the main battery portion is enabled to provide a voltage source for the vehicle, and such that the backup battery portion is external to the second circuit path that is enabled to provide the voltage source for the vehicle. In one example aspect, the backup battery portion is charged until a determination is made indicating that sufficient charging of the backup battery portion has occurred.

In one example aspect, the control device automatically communicates the transfer of energy from the backup battery portion to the main battery portion using a relay switch. The communication may be in response to receiving a command. In one example aspect, the receiving of the command includes one of: a user pressing a button or making a selection within the vehicle, the user making a selection of an action via a display component of the vehicle, the user making a selection via a separate device communicatively coupled to the vehicle, and the user making a selection via a separate device communicatively coupled to the vehicle.

In one example aspect, the command is received from a user of the vehicle via a communications interface. In another example aspect, the communication interface is further used for providing states of voltage or other health indicators levels of the main and backup battery portions to the user, e.g., such that the user may initiate the command.

In one example aspect, the vehicle battery of the present disclosure is designed such that the backup battery portion is mechanically attachable to the main battery portion of the vehicle using an interlocking system. In one example aspect, the interlocking system enables at least one of: a physical installation of the backup battery portion on top of the main battery portion, and a physical installation of the main battery portion on top of the backup battery portion. Then, when a relay switch is activated by the control device, the circuit path is formed so as to place the main battery portion in parallel with the backup battery portion. The backup battery portion is disconnected from the main battery portion when the relay switch is deactivated by the control device.

In one example aspect, the dimensions of vehicle battery are substantially equal to the dimensions of conventional batteries, e.g., the vehicle battery of the present disclosure may be used to replace a conventional battery of the vehicle.

In one example aspect, the reference voltage or other health indicator threshold is predetermined based on a type of vehicle. Moreover, in another example aspect, the reference voltage or other health indicator threshold is further adjustable by the user, e.g., a user of the vehicle or other system in which the battery is installed.

According to one example aspect of the disclosure, a method is provided for providing backup power to a vehicle using a vehicle or other system battery with a self-contained backup capability, the method comprising: receiving a command for transferring energy from a backup battery portion to a main battery portion or detecting that a voltage or other health indicator level of the main battery portion is below a reference level, communicating a transfer of energy from the backup battery portion to the main battery portion, forming a first circuit path so as to place the main battery portion in parallel with the backup battery portion, determining whether or not the voltage level or other health indicator of the main battery portion is greater than or equal to the reference level, and when the voltage or other health indicator level of the main battery portion is greater than or equal to the reference level, forming a second circuit path such that the main battery portion is enabled to provide the voltage source for the vehicle.

In one example aspect, the method further includes determining whether or not sufficient charging of the backup battery portion has occurred, and when sufficient charging of the backup battery portion has not occurred, continuing the charging of the backup battery portion until the backup battery portion is sufficiently charged.

In one example aspect, the control device communicating the transfer of energy from the backup battery portion to the main battery portion includes: forming the first circuit path such that the alternator of the vehicle is in enabled to charge both the main battery portion and the backup battery portion contemporaneously until at least the voltage or other health indicator level of the main battery portion is determined to be greater than or equal to the reference threshold, and when the voltage or other health indicator level of the main battery portion is determined to be greater than or equal to the reference threshold, forming the second circuit path such that the backup battery portion is external to the second circuit path that is enabled to provide the voltage source for the vehicle.

According to one example aspect of the disclosure, a system is provided for providing backup power to a vehicle using a vehicle or other system battery with a self-contained backup capability, the system including at least one processor configured to: receive a command for transferring energy from a backup battery portion to a main battery portion or detect that a voltage or other health indicator level of the main battery portion is below a reference level, communicate a transfer of energy from the backup battery portion to the main battery portion, form a first circuit path so as to place the main battery portion in parallel with the backup battery portion, determine whether or not the voltage level or other health indicator of the main battery portion is greater than or equal to the reference level; and when the voltage or other health indicator level of the main battery portion is greater than or equal to the reference level, form a second circuit path such that the main battery portion is enabled to provide the voltage source for the vehicle.

In one example aspect, a non-transitory computer-readable medium is provided storing a set of instructions thereon for providing backup power to a vehicle using a vehicle battery or other system battery with a self-contained backup capability, wherein the set of instructions comprises instructions for: receiving a command for transferring energy from a backup battery portion to a main battery portion or detecting that a voltage or other health indicator level of the main battery portion is below a reference level, communicating a transfer of energy from the backup battery portion to the main battery portion, forming a first circuit path so as to place the main battery portion in parallel with the backup battery portion, determining whether or not the voltage level or other health indicator of the main battery portion is greater than or equal to the reference level, and when the voltage or other health indicator level of the main battery portion is greater than or equal to the reference level, forming a second circuit path such that the main battery portion is enabled to provide the voltage source for the vehicle.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1:
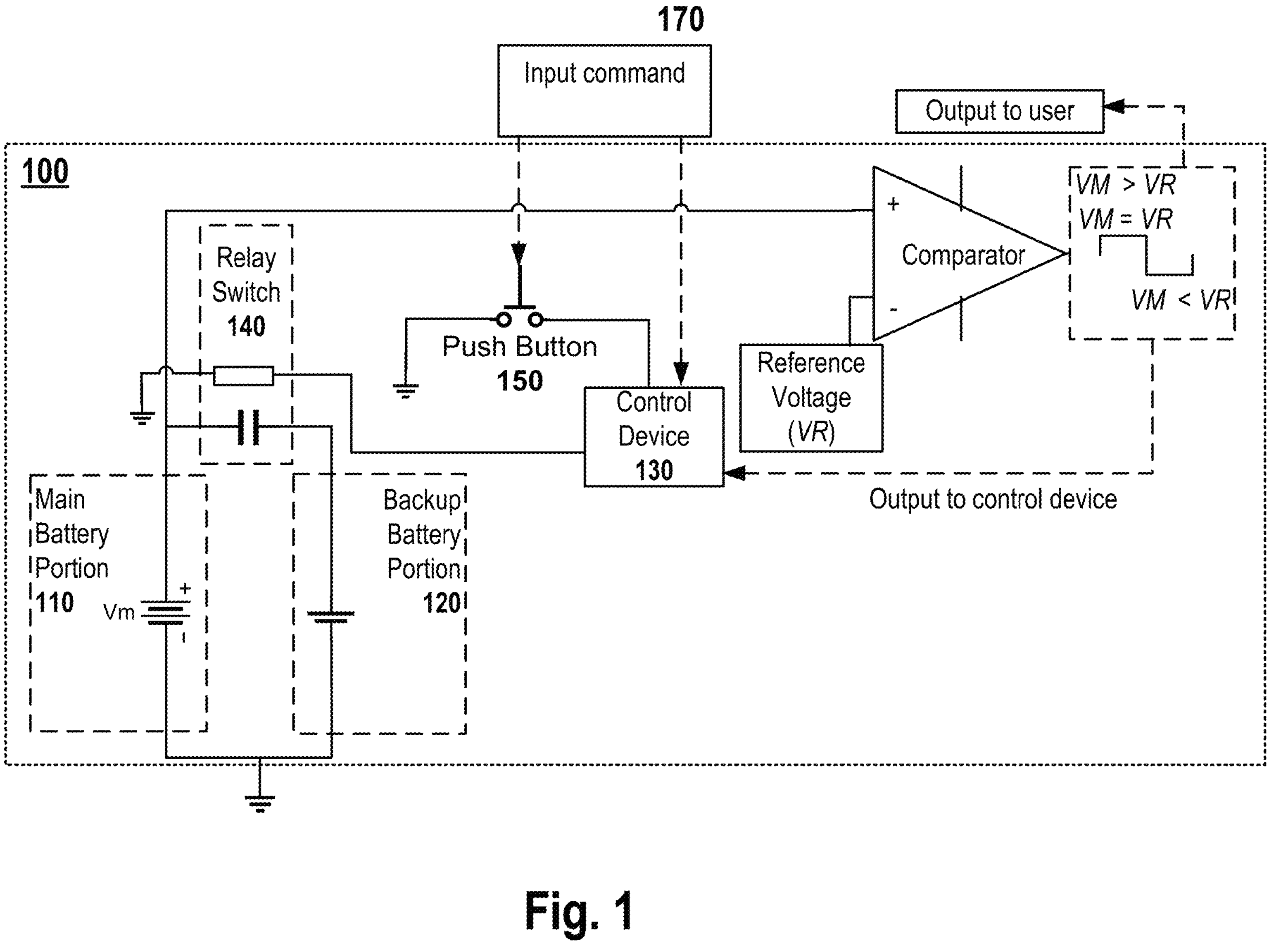
FIG. 1 illustrates an example representative block diagram of a vehicle or other battery with a self-contained backup capability, in accordance with aspects of the present disclosure.

Example aspects are described herein in the context of an apparatus, system, method, and various computer program features for providing backup power to a vehicle or other system using a battery with a self-contained backup capability, in accordance with aspects of the present disclosure. Those of ordinary skill in the art will realize that the following description is illustrative only and is not intended to be the only embodiment of the teachings in accordance with aspects of the present disclosure. Other aspects will readily suggest themselves to those skilled in the art having the benefit of the disclosure. Reference will now be made in detail to example implementations of various aspects as illustrated in the accompanying drawings. The same or similar reference indicators will be used to the extent possible throughout the drawings and the following description to refer to the same or like items. Accordingly, a detailed description of at least one preferred embodiment is provided herein.

In one example implementation, a vehicle battery with a self-contained backup capability is disclosed. The vehicle battery comprises: a main battery portion, a backup battery portion, and a control device for selectively communicating a transfer of energy from the backup battery portion to the main battery portion when a voltage level or other health indicator of the main battery portion is determined to be below a reference threshold. The main battery portion and backup battery portion may be each re-chargeable via an alternator of the vehicle when the control device communicates the transfer of energy between the main battery portion and the backup battery portion.

When the voltage level or other health indicator of the main battery portion is above the reference threshold, only the main battery portion may be used to provide a voltage source to the vehicle. Therefore, when the backup battery portion is not being utilized, the backup battery portion may remain external to a circuit that places the main and backup battery portions in parallel when backup is utilized. In contrast, when the voltage level or other health indicator of the main battery portion may be determined to be below the reference threshold, the transfer of energy from the backup battery portion to the main battery portion may be initiated through a circuit containing both the main battery portion and the backup battery portion. For example, a control device may selectively communicate the transfer of energy from the backup battery portion to the main battery portion when the transfer of additional energy to the main battery portion is needed or desired.

The transfer of energy may thereby be facilitated by forming a circuit path to place the main battery portion in parallel with the backup battery portion. For example, when vehicle starting is initiated when the main battery is low, the parallel connection may be selectively utilized to enable the backup battery portion to be used with or in place of the vehicle's main battery. In such situation, the alternator of the vehicle may be selectively utilized to charge both the main battery portion and the backup battery portion, such as contemporaneously, until at least the voltage level or other health indicator of the main battery portion is determined to be greater than or equal to a reference threshold (e.g., a minimum main battery portion charge level). The charging via the alternator may continue until both the main battery portion and the backup battery portion are fully charged.

FIG. 1 illustrates an example representative block diagram of a vehicle or other battery 100 (such vehicle or other battery also interchangeably referred to herein simply as "vehicle battery") with the self-contained backup capability in accordance with aspects of the present disclosure. The vehicle battery 100 shown in this example comprises: a main battery portion 110, a backup battery portion 120, and a control device 130. In one aspect, the control device 130 may comprise a microcontroller unit. When the voltage level or other health indicator of the main battery portion, $V_m$, is determined to be below a reference threshold, $V_R$, the control device 130 may operate so as to cause a transfer of energy from the backup battery portion 120 to the main battery portion 110.

In one aspect, the control device 130 may communicate the transfer of energy via a relay switch 140, for example. The relay switch 140 may be any suitable electrically actuated switch, for example. The relay switch 140 may be used to selectively form one of a first circuit path and a second circuit path based, for example, on whether or not the voltage level or other health indicator of the main battery portion is below the reference threshold.

In one aspect, when the voltage level or other health indicator of the main battery portion is below the reference threshold, the control device may communicate the transfer of energy automatically. In that event, the first circuit path may be formed, thereby placing the main battery portion in parallel with the backup battery portion, such that energy may transfer from the backup battery portion to the main battery portion. When the first circuit path is formed, both the main battery portion and the backup battery portion may be re-chargeable via the alternator of the vehicle, such as contemporaneously, until at least the voltage level or other health indicator of the main battery portion is determined to be greater than or equal to the reference threshold.

When the voltage level or other health indicator of the main battery portion is greater than or equal to the reference threshold, the second circuit path may be formed, such that:

(1) the main battery portion is enabled to provide a voltage source for the vehicle, and (2) the backup battery portion does not fall within a complete second circuit path that provides the backup voltage source for the vehicle.

In one aspect of an example implementation, the voltage level or other health indicator of the main battery portion may become greater than or equal to the reference threshold when the batteries are being charged via the alternator of the vehicle. In another aspect, a notification may issue (e.g., to a vehicle display or other signal, such as an audible signal; and/or a signal may be received on a cellular telephone or other device communicatively coupled to a vehicle system) upon the voltage level or other health indicator reaching the reference threshold. In yet another aspect, indication may be provided as to the voltage levels or other health indicators of the main and backup battery portions dynamically and/or upon request for access to such information (e.g., via a vehicle display or coupled device). In one aspect, the indications of the voltage levels or other health indicators of the main and backup battery portions may be presented via at least on one of: a dashboard of the vehicle, a device of the user communicatively coupled to the vehicle via a wireless or wire-based interface (e.g., smartphone connected via Bluetooth), or a key associated with the vehicle (e.g., a remote starter). In one aspect, the indications of the voltage levels or other health indicator of the main and backup battery portions may be presented in accordance with criteria selected and/or provided by a user or other selective input. For example, the user may set a parameter to be notified when the voltage level is at 5% of maximum, 20% of maximum, 80% of maximum, 95% of maximum, at maximum, and so on. In some example implementations, the user may select any number of reportable voltage levels or other health indicators. Moreover, the reportable voltage levels or other health indicators may be different for the main battery portion and the backup battery portion.

In another aspect, the control device may communicate the transfer of energy from the backup battery portion to the main battery portion in response to receiving a command input 170, such as an input from a driver or other occupant of the vehicle. For instance, the control device 130 may be coupled to a push button or other virtual or physical switch 150 (such push button or other physical or virtual switch also interchangeably being referred to herein as a "push button") for receiving a command 170 from the driver or other occupant of the vehicle. In an example implementation, a user may determine (e.g., via receipt of a warning message from the vehicle display) that the voltage level or other health indicator of the main battery portion 110 is below the reference threshold. Then, the user may, for example, push a button 150 to provide a command to the control device 130. Then, the control device 130 may initiate the transfer of energy from the backup battery portion 120 to the main battery portion 110 via the relay switch 140. The relay switch may form a first circuit path, along the lines as described above, enabling the transfer of energy form the backup battery portion 120 to the main battery portion 110 to occur. In addition, for example, when the vehicle engine is operating, the alternator may then selectively or automatically charge both battery portions 110, 120. When the voltage level or other health indicator of the main battery portion 110 becomes greater than or equal to the reference threshold, for example, a second circuit path may formed enabling the main battery portion 110 to provide energy to the vehicle while the backup battery portion 120 returns to its normal standby position. Optionally, the circuitry may allow for the backup battery portion 120 to be recharged, up to its full capacity, for example, during engine operation when no recharging of the main battery portion 110 is occurring. Further, such recharging of the backup battery portion may be maintained if the main battery portion 110 is determined not to be properly rechargeable (e.g., via sensing of excessive voltage drop of the main battery portion during certain loads or repeated or excessive low battery detection for the main battery portion 110).

In one aspect, the receiving of the command from an occupant or other user of the vehicle may comprise one or more of: the user pressing a button or otherwise making a selection within the vehicle, the user making a selection of an action via a display component of the vehicle, the user making a selection via a separate device communicatively coupled to the vehicle (e.g., a smartphone, key), and the user making a selection via a separate device communicatively coupled to the vehicle (e.g., menu being displayed on a smartphone communicatively coupled to the vehicle). In other words, the command could be received via a variety of input events, such as a vehicle occupant or external owner, or automated features, providing physical, voice, or electronic input via a vehicle selection device (e.g., via steering wheel located selector) or via a separate device (e.g., a cellular telephone or key fob communicatively coupled to the vehicle).

In one aspect, the vehicle battery of the present disclosure may be designed such that the backup battery portion is mechanically attachable to the main battery portion of the vehicle using an interlocking system. The interlocking system may enable at least one of: a physical installation of the backup battery portion on top of or adjacent to the main battery portion, and a physical installation of the main battery portion on top of or adjacent to the backup battery portion.

Figure 2:
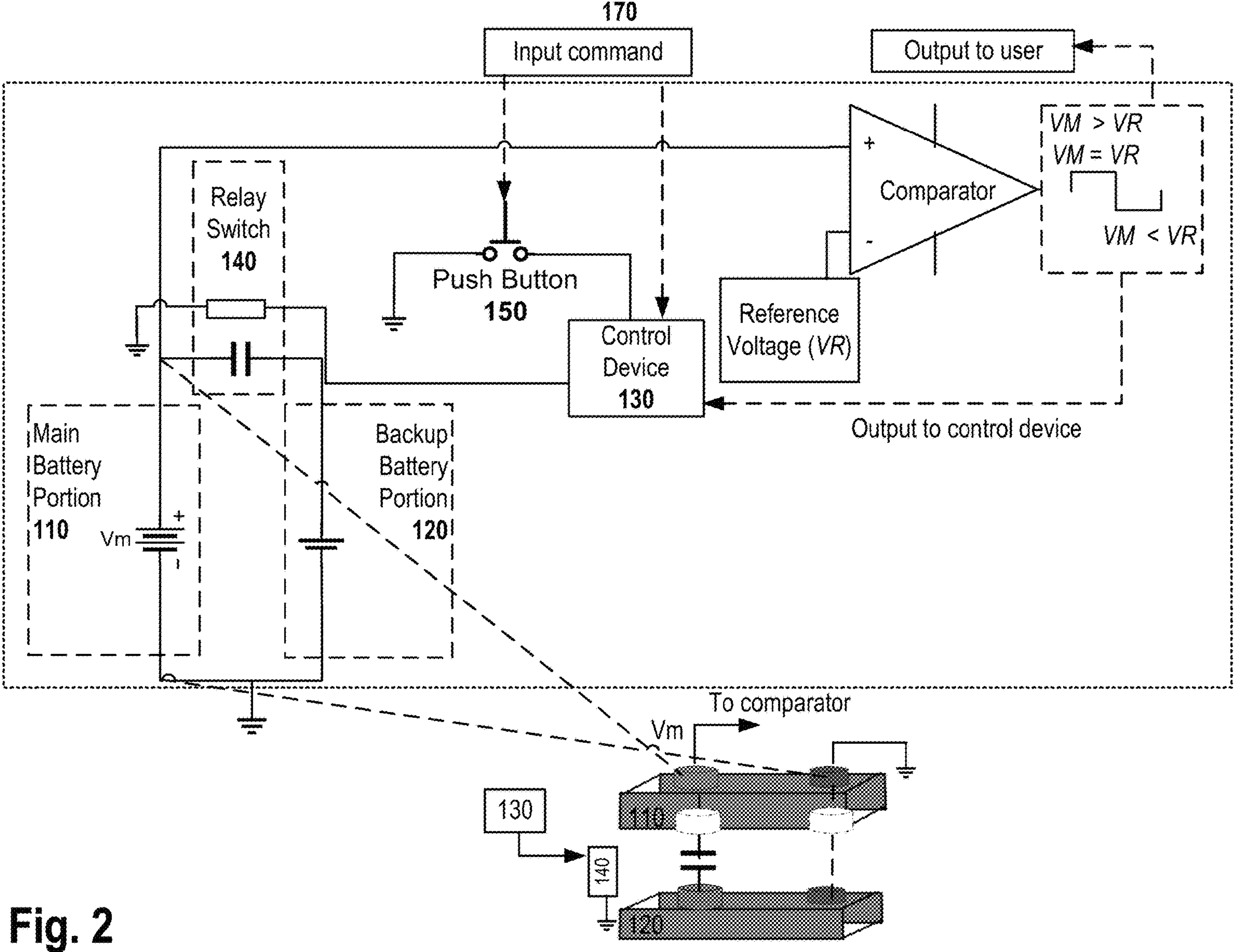
FIG. 2 illustrates an example implementation including an interlocking system with a physical installation of a main battery portion on top of a backup battery portion, in accordance with aspects of the present disclosure.
Figure 3:
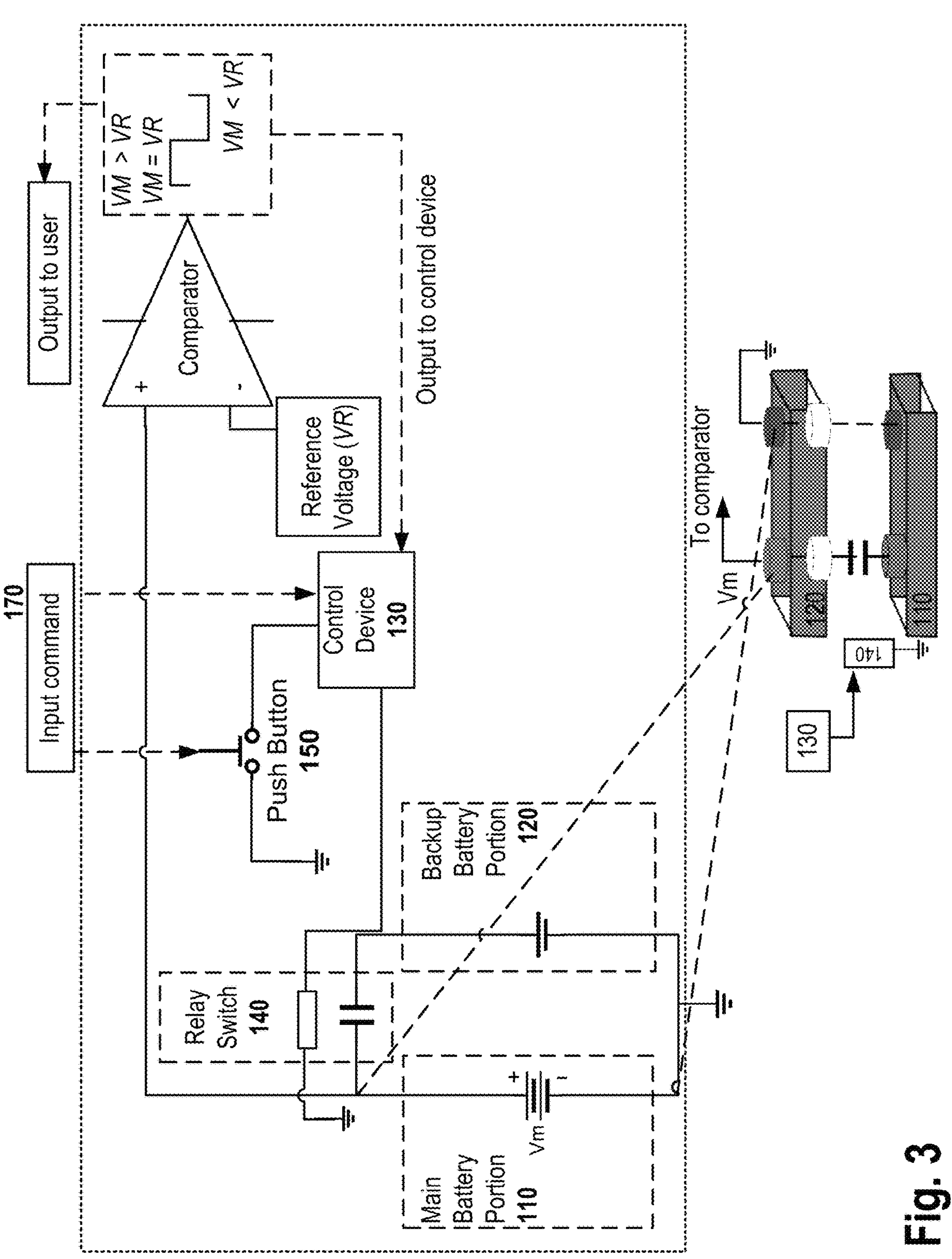
FIG. 3 illustrates another example implementation of an interlocking system with a physical installation of the backup battery portion on top of the main battery portion, in accordance with aspects of the present disclosure.

FIG. 2 illustrates the interlocking system with a physical installation of the main battery portion 110 on top of the backup battery portion 120. FIG. 3 illustrates the interlocking system with a physical installation of the backup battery portion 120 on top of the main battery portion 110. As shown in FIG. 2 and FIG. 3, a circuit path may be formed so as to place the main battery portion 110 in parallel with the backup battery portion 120 when the relay switch 140 is activated via the control device 130. The backup battery portion 120 may be disconnected from the main battery portion 110 when the relay switch 140 is deactivated via the control device 130.

In one aspect, the dimensions of the vehicle battery (e.g., the combination of the main battery portion 110 with the backup battery 120) may be substantially equal in overall size to the dimensions of a corresponding conventional battery. Thus, for example, the vehicle battery 110, 120 of the present disclosure may be sized so as to replace the same area as a corresponding conventional battery.

In one aspect, the reference voltage threshold or other health indicator may be predetermined based on a type of vehicle. For example, a small vehicle may require less energy to start when compared to a truck, a bus, etc. Thus, the size of the combined backup battery and/or reference voltage threshold or other health indicator for signifying a need to utilize the backup battery portion may be varied based on the size of engine, weight of a vehicle, type of car (e.g., electric vs. combustion engine), and so on. In another aspect, the reference voltage or other health indicator threshold may be further adjustable via selective input.

In one aspect, the battery may further include an indicator of the health of the battery. For example, an LED may be included on top of the battery. In one aspect, the indicator of the health may be selectively activated to display the battery status (i.e., battery health) upon a command from a user. The command for activating the LED or any other indicator may be issued by the user pressing a button for a predetermined short period of time, e.g., a few seconds. The displaying of the battery health on the LED may terminate after an expiration of a predetermined display time period. For example, a user may press a button to activate the displaying of the status. Then, after a few seconds, the LED may turn off. Thus, in one example implementation, the displaying is not continuous. However, in another aspect, the displaying of the battery health may be continuous. For instance, different colors may be used for different levels of battery health.

In one aspect, the pressing of the button to activate the LED, the selection of an action upon detection of the backup battery being engaged, etc. may be performed via a remote selection. For instance, an app in a user device or vehicle may be used to issue commands and receive indicators.

Figure 4:
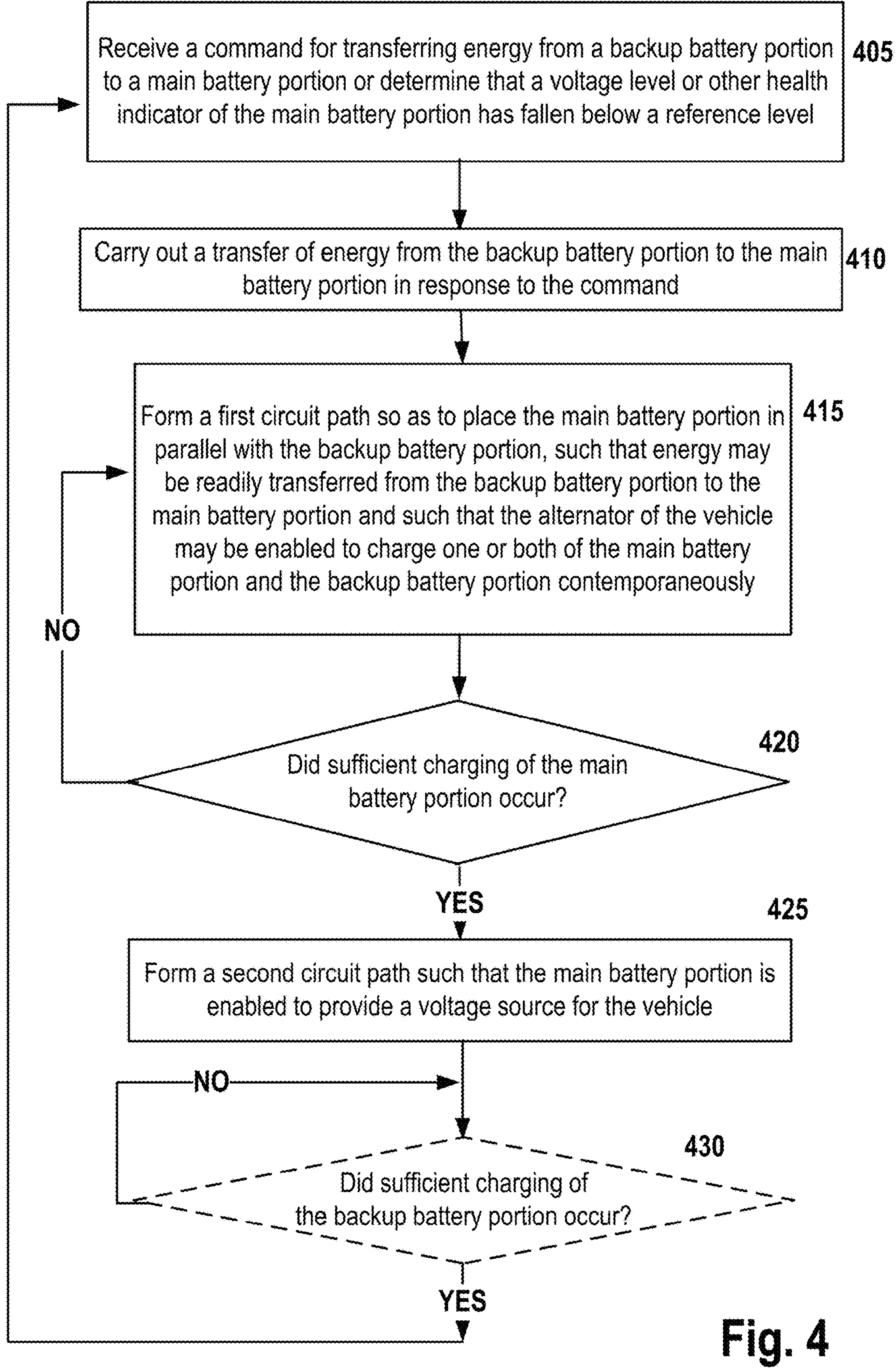
FIG. 4 illustrates a flowchart of an example method for providing power to a vehicle using a vehicle battery with a self-contained backup capability, in accordance with aspects of the present disclosure.

FIG. 4 illustrates a flowchart of an example method 400 for providing power to a vehicle using a vehicle battery with backup capability in accordance with aspects of the present disclosure. The method 400 may be implemented in a control device, for example, control device 130, of a vehicle, as shown and discussed with regard to FIGS. 1-3 above.

In step 405, a command for transferring energy from a backup battery portion to a main battery portion may be received or a determination may be made that a voltage level or other health indicator of the main battery portion has fallen below a reference level.

In step 410, a transfer of energy from the backup battery portion to the main battery portion may be carried out in response to the command. In one aspect, the communication may be performed via a relay switch. Thus, for example, in response to receiving a command from the user or detecting a voltage level or other health indicator below the reference level, the control device may initiate the transfer of energy.

In step 415, a first circuit path is formed so as to place the main battery portion in parallel with the backup battery portion, such that energy may be readily transferred from the backup battery portion to the vehicle and such that the alternator of the vehicle may be enabled to charge one or both of the main battery portion and the backup battery portion (e.g., until at least the voltage level or other health indicator of the main battery portion is determined to be greater than or equal to the reference threshold).

In step 420, a determination may be made (e.g., such determination may be made at various intervals) as to whether or not sufficient charging of the main battery portion has occurred. For example, the voltage level or other health indicator of the main battery portion may be determined to be greater than or equal to the reference level, so as to indicate sufficient charging. Alternatively, for example, such determination of sufficient charging may occur by conducting voltage measurement when an appropriate load is placed on the main battery (e.g., at engine startup). When sufficient charging of the main battery portion is determined to have occurred, the method may proceed to step 425. Otherwise, the method may proceed to step 415 and continue the step of charging and/or checking sufficient charge of the main battery.

In step 425, a second circuit path may be formed, such that the main battery portion is enabled to provide a voltage source for the vehicle. That is, within this second circuit path, only the main battery portion may be needed for providing a voltage to the vehicle. Therefore, the backup battery portion may be placed external to the second circuit path.

In optional step 430, a determination may be made as to whether or not sufficient charging of the backup battery portion has occurred. When sufficient charging of the backup battery portion has not occurred, the method remains in step 430 and continues the steps of charging and/or checking sufficient charge of the backup battery. When sufficient charging of the backup battery portion is determined to have occurred, the method may terminate charging of the backup battery and end such charging until, for example, a command or other operation (e.g., automatic determination of need to charge due to low battery level) may cause the method to begin again at step 405.

In one aspect, after the charging is completed, the method may send an indication to the vehicle or other user device, for example, to indicate to the user that the backup battery was engaged. In one aspect, the indication sent to the user may further comprise an action to be taken by the user. For instance, the action may include contacting a dealer of the vehicle such that the health of the battery may be checked.

Figure 5:
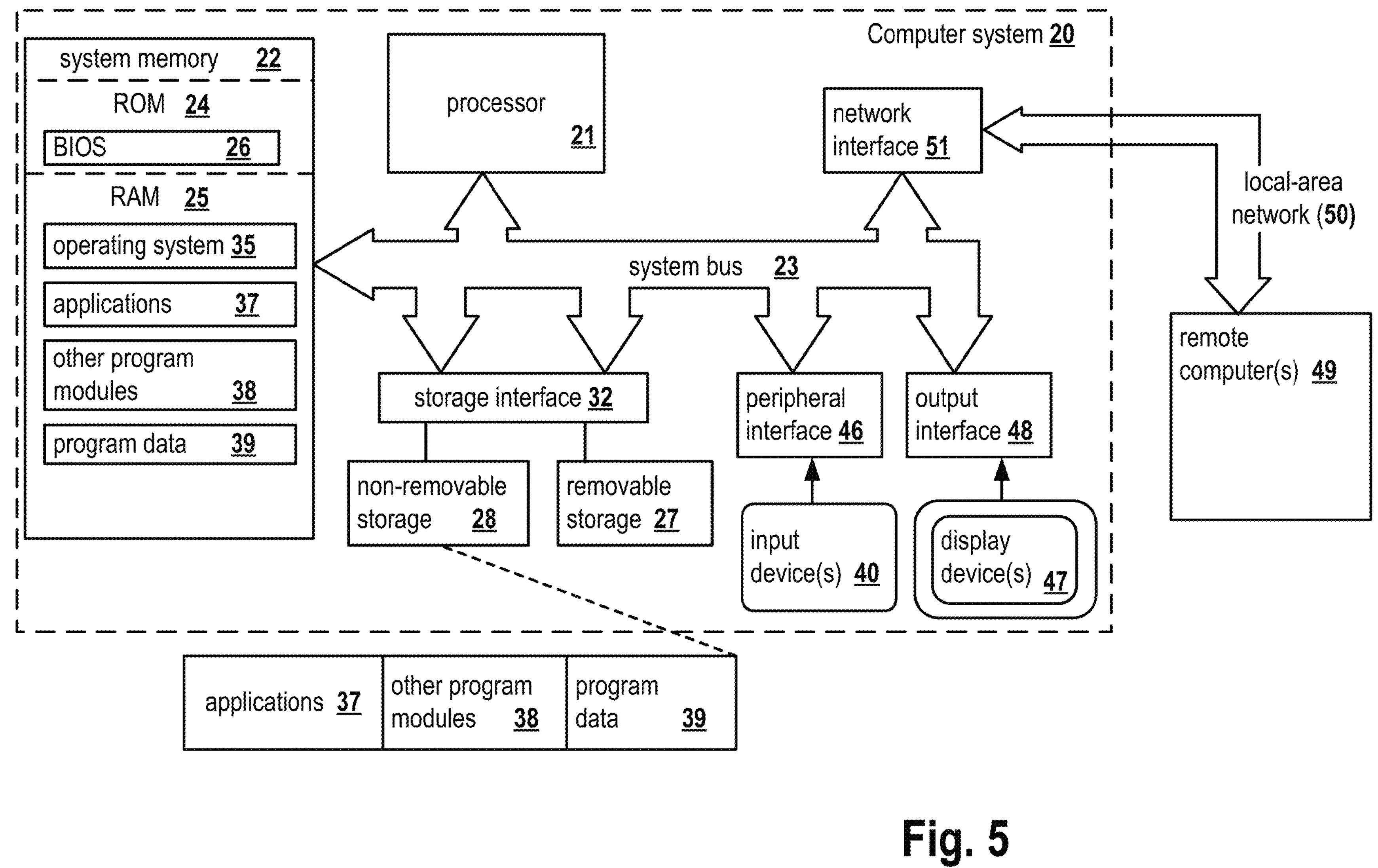
FIG. 5 presents a representative diagram of an example of various components and features of a general purpose computer system usable or incorporable with various features in accordance with aspects of the present disclosure.

FIG. 5 is a block diagram illustrating various components of an example computer system 20 via which aspects of the present disclosure for providing power to a vehicle using a vehicle battery with a self-contained backup capability may be implemented. The computer system 20 may, for example, be or include a computing system of the vehicle, or may comprise a separate computing device communicatively coupled to the vehicle, etc. In addition the computer system 20 may be in the form of multiple computing devices, or in the form of a single computing device, including, for example, a mobile computing device, a cellular telephone, a smart phone, a desktop computer, a notebook computer, a laptop computer, a tablet computer, a server, a mainframe, an embedded device, and other forms of computing devices.

As shown in FIG. 5, the computer system 20 may include one or more central processing units (CPUs) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, HyperTransport™, InfiniBand™, Serial ATA, $I^2C$, and other suitable interconnects. The central processing unit 21 (also referred to as a processor) may include a single or multiple sets of processors having single or multiple cores. The processor 21 may execute one or more computer-executable lines of code implementing techniques in accordance with aspects of the present disclosure. The system memory 22 may be or include any memory for storing data used herein and/or computer programs that are executable via the processor 21. The system memory 22 may include volatile memory, such as a random access memory (RAM) 25 and non-volatile memory, such as a read only memory (ROM) 24, flash memory, etc., or any combination thereof. The basic input/output system (BIOS) 26 may store the basic procedures for transfer of information among elements of the computer system 20, such as those at the time of loading the operating system with the use of the ROM 24.

The computer system 20 may include one or more storage devices, such as one or more removable storage devices 27, one or more non-removable storage devices 28, or a combination thereof. The one or more removable storage devices 27 and non-removable storage devices 28 may be coupled to the system bus 23 via a storage interface 32. In an aspect, the storage devices and the corresponding computer-readable storage media may be or include power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory, such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology, such as in solid state drives (SSDs) or flash drives; magnetic cassettes, magnetic tape, and magnetic disk storage, such as in hard disk drives or floppy disks; optical storage, such as in compact disks (CD-ROM) or digital versatile disks (DVDs); and any other medium that may be used to store the desired data and that may be accessed via the computer system 20.

The system memory 22, removable storage devices 27, and/or non-removable storage devices 28 of the computer system 20 may be used to store an operating system 35, additional program applications 37, other program modules 38, and/or program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47, such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

Figure 6:
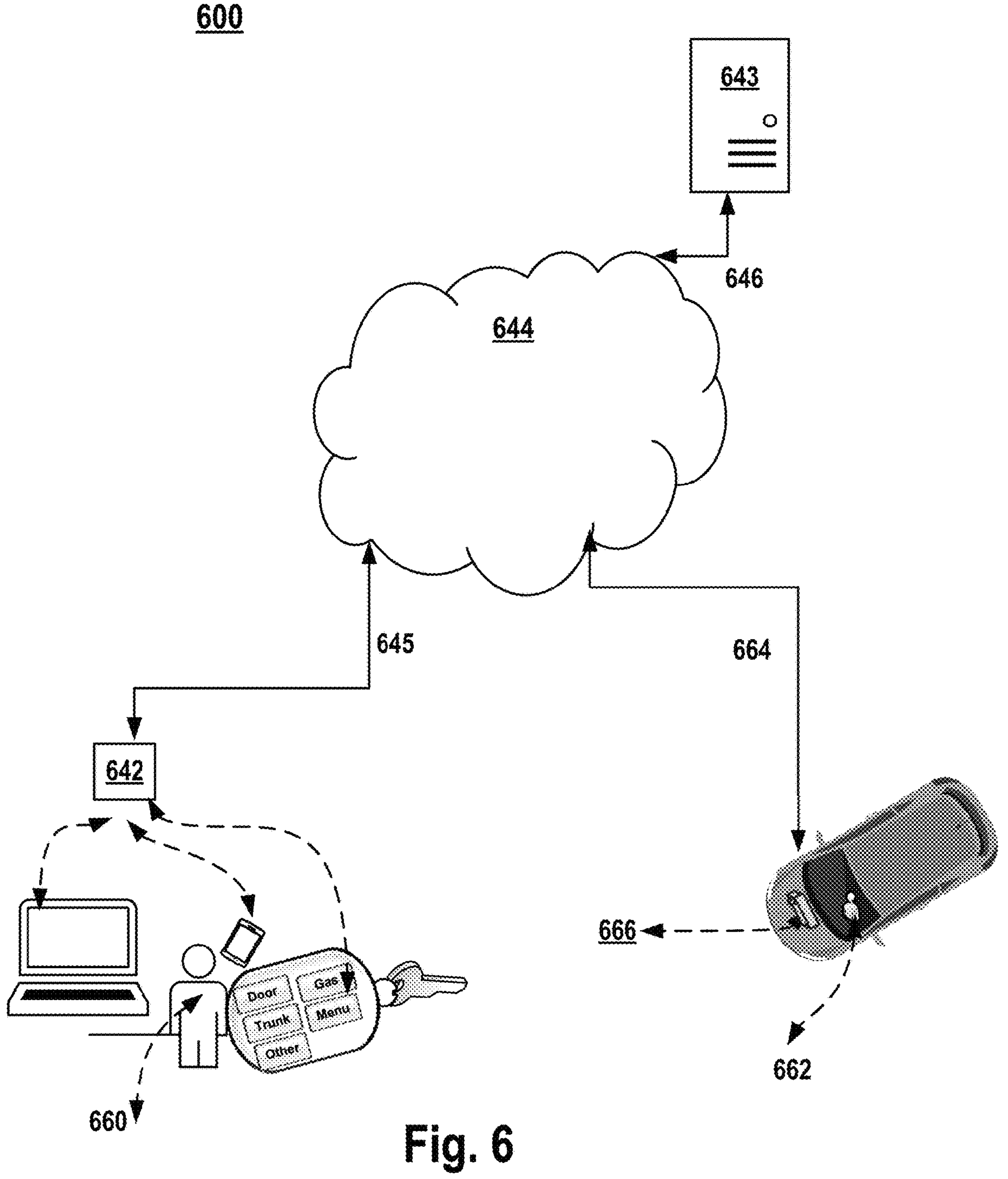
FIG. 6 is a block diagram of various example system components, usable in accordance with aspects of the present disclosure.

The computer system 20 may operate in a network environment as shown in FIG. 6, using a network connection to one or more remote computers 49. The remote computer (or computers) 49 may be or include local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks, such as a local-area computer network (LAN) 50, a wide-area computer network (WAN), an intranet, and the Internet. Examples of the network interface 51 may include an Ethernet interface, a Frame Relay interface, SONET interface, and wireless interfaces.

FIG. 6 is a block diagram of various example system components, usable in accordance with aspects of the present disclosure. FIG. 6 shows a communication system 600 usable in accordance with aspects of the present disclosure. The communication system 600 includes one or more accessors 660, 662 (also referred to interchangeably herein as one or more "users") and one or more terminals 642, 666. In one aspect, data for use in accordance with aspects of the present disclosure may, for example, be input and/or accessed by accessors 660, 662 via terminals 642, 666, such as personal computers (PCs), minicomputers, mainframe computers, microcomputers, telephonic devices, or wireless devices, such as personal digital assistants ("PDAs"), smart phones, key fobs, or other hand-held wireless devices coupled to a server 643, such as a PC, minicomputer, mainframe computer, microcomputer, or other device having a processor and a repository for data and/or connection to a repository for data, via, for example, a network 644, such as the Internet or an intranet, and couplings 645, 646, 664. In one aspect, the command may be issued by the vehicle battery, e.g., element 666 of FIG. 6. The couplings 645, 646, 664 may include, for example, wired, wireless, or fiberoptic links. In another variation, various features of the method and system in accordance with aspects of the present disclosure may operate in a stand-alone environment, such as on a single terminal. In one aspect, the server 643 may be a remote computer 49, as shown in FIG. 5, or a local server.

Aspects of the present disclosure may be or include a system, a method, and/or a computer program product. The computer program product may include a computer readable storage medium (or media) having computer readable program instructions thereon for causing a processor to carry out aspects of the present disclosure.

The computer readable storage medium may be or include a tangible device that may retain and store program code in the form of instructions or data structures that may be accessed via a processor of a computing device, such as the computing system 20. The computer readable storage medium may be or include an electronic storage device, a magnetic storage device, an optical storage device, an electromagnetic storage device, a semiconductor storage device, or any suitable combination thereof. By way of example, such computer-readable storage medium may comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device, such as punch-cards or raised structures in a groove having instructions recorded thereon. As used herein, a computer readable storage medium is not to be construed as being or only being transitory signals per se, such as radio waves or other freely propagating electromagnetic waves, electromagnetic waves propagating through a waveguide or transmission media, or electrical signals transmitted through a wire.

Computer readable program instructions described herein may be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations in accordance with aspects of the present disclosure may be or include assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be coupled to the user's computer via any suitable type of network, including a LAN or WAN, or the connection may be made to an external computer (for example, through the Internet). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform various functions in accordance with aspects of the present disclosure.

In various aspects, the systems and methods described in the present disclosure may be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 5, above). Accordingly, each module may be realized in a variety of suitable configurations, and should not be limited to any particular implementation shown or described as an example herein.

In the interest of clarity, not all of the routine features of the aspects are disclosed herein. It will be appreciated that in the development of any actual implementation of features in accordance with aspects of the present disclosure, numerous implementation-specific decisions may be made in order to achieve the developer's specific goals, and these specific goals may vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of various features in accordance with aspects of the present specification are to be interpreted by one of ordinary skill in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it will be apparent to those skilled in the art having the benefit of this disclosure that many more modifications than mentioned above are possible without departing from the innovative concepts disclosed herein.

The invention claimed is:

1. A vehicle or other system battery with a self-contained backup capability, comprising:

a vehicle battery unit of the vehicle, wherein the vehicle battery unit includes:

a main battery portion; and a backup battery portion; and a control device for selectively communicating a transfer of energy from the backup battery portion to the main battery portion when a voltage or other health indicator level of the main battery portion is determined to be below a reference threshold, wherein the backup battery portion is mechanically attachable to the main battery portion of the vehicle battery unit using an interlocking system, wherein the main battery portion and the backup battery portion are each directly re-chargeable contemporaneously via an alternator of the vehicle, wherein the control device automatically communicates the transfer of energy from the backup battery portion to the main battery portion using a relay switch, and wherein the control device for selectively communicating the transfer of energy from the backup battery portion to the main battery portion further comprises:

forming a first circuit path so as to place the main battery portion in parallel with the backup battery portion, such that the alternator of the vehicle is enabled to charge both the main battery portion and the backup battery portion contemporaneously until at least the voltage or other health indicator level of the main battery portion is determined to be greater than or equal to the reference threshold; and when the voltage or other health indicator level of the main battery portion is determined to be greater than or equal to the reference threshold, forming a second circuit path such that the main battery portion is enabled to provide a voltage source for the vehicle, and such that the backup battery portion is external to the second circuit path that is enabled to provide the voltage source for the vehicle.

2. The vehicle or other system battery of claim 1, wherein the control device communicates the transfer of energy from the backup battery portion to the main battery portion in response to receiving a command.

3. The vehicle or other system battery of claim 2, wherein the command is received from a user of the vehicle via a communications interface, and wherein the communications interface is further used for providing states of voltage or other health indicators levels of the main battery portion and the backup battery portion to the user.

4. The vehicle or other system battery of claim 2, wherein the receiving the command comprises one of: a user pressing a button or making a selection within the vehicle, the user making a selection of an action via a display component of the vehicle, the user making a selection via a separate device communicatively coupled to the vehicle, and the user making a selection via a separate device communicatively coupled to the vehicle.

5. The vehicle or other system battery of claim 1, wherein the interlocking system enables at least one of: a physical installation of the backup battery portion on top of the main battery portion, and a physical installation of the main battery portion on top of the backup battery portion; and wherein a circuit path is formed so as to place the main battery portion in parallel with the backup battery portion when the relay switch is activated by the control device, and wherein the backup battery portion is disconnected from the main battery portion when the relay switch is deactivated by the control device.

6. The vehicle or other system battery of claim 1, wherein a reference voltage or other health indicator threshold is predetermined based on a type of vehicle.

7. The vehicle or other system battery of claim 6, wherein the reference voltage or other health indicator threshold is further adjustable by a user.

8. The vehicle or other system battery of claim 1, wherein the control device is a microcontroller unit or an Application Specific Integrated Circuit.

9. The vehicle or other system battery of claim 1, wherein the backup battery portion is charged until a determination is made indicating that sufficient charging of the backup battery portion has occurred.

10. A method for providing a voltage source to a vehicle using a vehicle battery with a self-contained backup capability, the method comprising:

receiving a command for transferring energy from a backup battery portion of a vehicle battery unit to a main battery portion of the vehicle battery unit or detecting that a voltage or other health indicator level of a main battery portion is below a reference level, wherein the backup battery portion is mechanically attachable to the main battery portion of the vehicle battery unit using an interlocking system;

communicating a transfer of energy from the backup battery portion to the main battery portion using a relay switch;

forming a first circuit path so as to place the main battery portion in parallel with the backup battery portion and that an alternator of the vehicle is enabled to charge both the main battery portion and the backup battery portion contemporaneously until at least the voltage or other health indicator level of the main battery portion is determined to be greater than or equal to a reference threshold; and when the voltage or other health indicator level of the main battery portion is determined to be greater than or equal to the reference threshold, forming a second circuit path such that the backup battery portion is external to the second circuit path and is enabled to provide the voltage source for the vehicle, wherein both the main battery portion and the backup battery portion are each directly re-chargeable contemporaneously via an alternator of the vehicle.

11. The method of claim 10, further comprising:

determining whether or not sufficient charging of the backup battery portion has occurred; and when sufficient charging of the backup battery portion has not occurred, continuing charging of the backup battery portion until the backup battery portion is sufficiently charged.

12. A system for providing a voltage source to a vehicle using a vehicle or other system battery with a self-contained backup capability, comprising:

at least one processor configured to:

receive a command for transferring energy from a backup battery portion of a vehicle battery unit to a main battery portion of the vehicle battery unit or detect that a voltage or other health indicator level of the main battery portion is below a reference level, wherein the backup battery portion is mechanically attachable to the main battery portion of the vehicle battery unit using an interlocking system;

communicate a transfer of energy from the backup battery portion to the main battery portion using a relay switch;

form a first circuit path so as to place the main battery portion in parallel with the backup battery portion and that and alternator of the vehicle is enabled to charge both the main battery portion and the backup battery portion contemporaneously until at least the voltage level or other health indicator of the main battery portion is determined to be greater than or equal to a reference threshold;

determine whether or not a voltage level or other health indicator of the main battery portion is greater than or equal to the reference threshold; and when the voltage level or other health indicator of the main battery portion is determined to be greater than or equal to the reference threshold, form a second circuit path such that the backup battery portion is external to the second circuit path and the main battery portion is enabled to provide the voltage source for the vehicle, wherein both the main battery portion and the backup battery portion are each directly re-chargeable contemporaneously via an alternator of the vehicle.

13. The system of claim 12, wherein the at least one processor is further configured to:

determine whether or not sufficient charging of the backup battery portion has occurred; and when sufficient charging of the backup battery portion has not occurred, continue charging of the backup battery portion until the backup battery portion is sufficiently charged.

14. A non-transitory computer readable medium storing thereon computer executable instructions for providing a voltage source to a vehicle, using a vehicle or other system battery with a self-contained backup capability, including instructions for:

receiving a command for transferring energy from a backup battery portion of a vehicle battery unit to a main battery portion of the vehicle battery unit or detecting that a voltage level or other health indicator of the main battery portion is below a reference level, wherein the backup battery portion is mechanically attachable to the main battery portion of the vehicle battery unit using an interlocking system;

communicating a transfer of energy from the backup battery portion to the main battery portion using a relay switch;

forming a first circuit path so as to place the main battery portion in parallel with the backup battery portion and an alternator of the vehicle is in enabled to charge both the main battery portion and the backup battery portion contemporaneously until at least the voltage level or other health indicator of the main battery portion is determined to be greater than or equal to a reference threshold;

determining whether or not the voltage level or other health indicator of the main battery portion is greater than or equal to the reference level; and when the voltage level or other health indicator of the main battery portion is greater than or equal to the reference level, forming a second circuit path such that the backup battery portion is external to the second circuit path and the main battery portion is enabled to provide the voltage source for the vehicle, wherein both the main battery portion and the backup battery portion are each directly re-chargeable contemporaneously via an alternator of the vehicle.

15. The non-transitory computer readable medium of claim 14, the instructions including further instructions for:

determining whether or not sufficient charging of the backup battery portion has occurred; and when sufficient charging of the backup battery portion has not occurred, continuing charging of the backup battery portion until the backup battery portion is sufficiently charged.

16. The vehicle or other system battery of claim 1, wherein the main battery portion has a main battery positive terminal and a main battery negative terminal, wherein the backup battery portion has a backup battery positive terminal and a backup battery negative terminal, and wherein the communication of the transfer of energy includes making a first direct non-stepped up or stepped down circuit connection of the main battery positive terminal with the backup battery positive terminal, and making a second direct non-stepped up or stepped down circuit connection of the main battery negative terminal with the backup battery negative terminal.

17. The vehicle or other system battery of claim 1, wherein the main battery portion and the backup battery portion have a same voltage level.

18. The vehicle or other system battery of claim 1, wherein a combination of the batteries after the backup battery portion and the main battery portion are interlocked has dimensions to enable installation in a conventionally sized battery box.

19. The vehicle or other system battery of claim 1, wherein the vehicle includes a combustion engine.

* * * * *